US012355187B2

(12) United States Patent
Fan et al.

(10) Patent No.: US 12,355,187 B2
(45) Date of Patent: Jul. 8, 2025

(54) CONNECTOR AND CONNECTOR ASSEMBLY

(71) Applicant: Tyco Electronics (Shanghai) Co. Ltd., Shanghai (CN)

(72) Inventors: Dingbing (Frank) Fan, Shanghai (CN); Ming Shi, Shanghai (CN); Beibei Jing, Shanghai (CN); Xiaozhi (George) Fu, Shanghai (CN); Wei Zhang, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 382 days.

(21) Appl. No.: 17/826,656

(22) Filed: May 27, 2022

(65) Prior Publication Data

US 2022/0384991 A1 Dec. 1, 2022

(30) Foreign Application Priority Data

May 28, 2021 (CN) ......................... 202121175669.6

(51) Int. Cl.

| | |
|---|---|
| ***H01R 13/62*** | (2006.01) |
| ***H01R 13/502*** | (2006.01) |
| ***H01R 13/627*** | (2006.01) |
| ***H01R 13/629*** | (2006.01) |
| ***H01R 13/639*** | (2006.01) |

(52) U.S. Cl.

CPC ....... *H01R 13/6271* (2013.01); *H01R 13/502* (2013.01); *H01R 13/629* (2013.01); *H01R 13/639* (2013.01)

(58) Field of Classification Search

CPC ....................... H01R 13/6271; H01R 13/6273; H01R 13/62; H01R 13/502; H01R 13/629; H01R 13/639; H01R 13/4361; H01R 13/6272

See application file for complete search history.

(56) References Cited

U.S. PATENT DOCUMENTS

| | | | | |
|---|---|---|---|---|
| 5,330,369 A * | 7/1994 | Nozaki | H01R 13/6272 | 439/350 |
| 5,584,719 A * | 12/1996 | Tsuji | H01R 13/6272 | 439/357 |
| 5,628,649 A * | 5/1997 | Yagi | H01R 13/6272 | 439/354 |
| 6,116,939 A * | 9/2000 | Fukuda | H01R 13/6272 | 439/923 |

(Continued)

FOREIGN PATENT DOCUMENTS

| | | |
|---|---|---|
| DE | 102009032003 A1 | 1/2011 |
| WO | 2019178053 A1 | 9/2019 |

OTHER PUBLICATIONS

Extended European Search Report dated Oct. 17, 2022 corresponding to Application No. 22174823.9-1201, 7 pages.

*Primary Examiner* — Harshad C Patel
(74) *Attorney, Agent, or Firm* — Barley Snyder

(57) ABSTRACT

A connector includes a housing and an elastic latch. The elastic latch includes an elastic cantilever having a free end, a fixed end connected to the housing, and a main part extending between the free end and the fixed end. The fixed end has an inclined surface extending inclined with respect to a surface of the housing. An angle between the inclined surface and the surface of the housing is greater than 90 degrees.

18 Claims, 5 Drawing Sheets

(56) References Cited

U.S. PATENT DOCUMENTS

| | | | | |
|---|---|---|---|---|
| 6,435,895 | B1 * | 8/2002 | Fink | H01R 13/6272 439/352 |
| 7,909,638 | B2 * | 3/2011 | Seo | H01R 13/6272 439/352 |
| 8,920,187 | B2 * | 12/2014 | Kon | H01R 13/641 439/352 |
| 9,368,909 | B2 * | 6/2016 | Yagi | H01R 13/6272 |
| 10,177,481 | B1 * | 1/2019 | Hung | H01R 13/4367 |
| 10,784,620 | B2 * | 9/2020 | Azad | H01R 13/641 |
| 2002/0119693 | A1 * | 8/2002 | Chen | H01R 13/6272 439/358 |
| 2003/0171027 | A1 * | 9/2003 | Shuey | H01R 13/6272 439/489 |
| 2004/0067676 | A1 * | 4/2004 | Nimura | H01R 13/6272 439/352 |
| 2004/0248453 | A1 * | 12/2004 | McLauchlan | H01R 13/6272 439/352 |
| 2012/0282791 | A1 * | 11/2012 | Brown | H01R 13/639 439/157 |
| 2016/0164224 | A1 * | 6/2016 | Sekino | H01R 13/6272 439/352 |
| 2016/0372867 | A1 * | 12/2016 | Upson | H01R 13/4361 |
| 2017/0179646 | A1 * | 6/2017 | Holub | H01R 13/641 |
| 2019/0280429 | A1 * | 9/2019 | Azad | H01R 13/64 |

* cited by examiner

CONNECTOR AND CONNECTOR ASSEMBLY

CROSS-REFERENCE TO RELATED APPLICATION

This application claims the benefit of the filing date under 35 U.S.C. § 119(a)-(d) of Chinese Patent Application No. 202121175669.6, filed on May 28, 2021.

FIELD OF THE INVENTION

The present invention relates to a connector and a connector assembly including the connector.

BACKGROUND

In the prior art, in order to lock a connector to a mating connector, an elastic latch is usually formed on the housing of the connector. The elastic latch comprises an elastic cantilever and a protrusion formed on the elastic cantilever. The protrusion engages with a step part formed on a mating housing of the mating connector to lock the housing of the connector and the mating housing of the mating connector.

In the prior art, the fixed end of the elastic cantilever of the elastic latch is usually in the shape of a semi-circular ring, and the fixed end of the semi-circular ring is directly connected to the surface of the housing. The strength of this connection structure of elastic latch is insufficient and cannot meet the special applications requiring large locking force.

SUMMARY

A connector includes a housing and an elastic latch. The elastic latch includes an elastic cantilever having a free end, a fixed end connected to the housing, and a main part extending between the free end and the fixed end. The fixed end has an inclined surface extending inclined with respect to a surface of the housing. An angle between the inclined surface and the surface of the housing is greater than 90 degrees.

BRIEF DESCRIPTION OF THE DRAWINGS

The invention will now be described by way of example with reference to the accompanying Figures, of which.

DETAILED DESCRIPTION OF THE EMBODIMENTS

Figure 1:
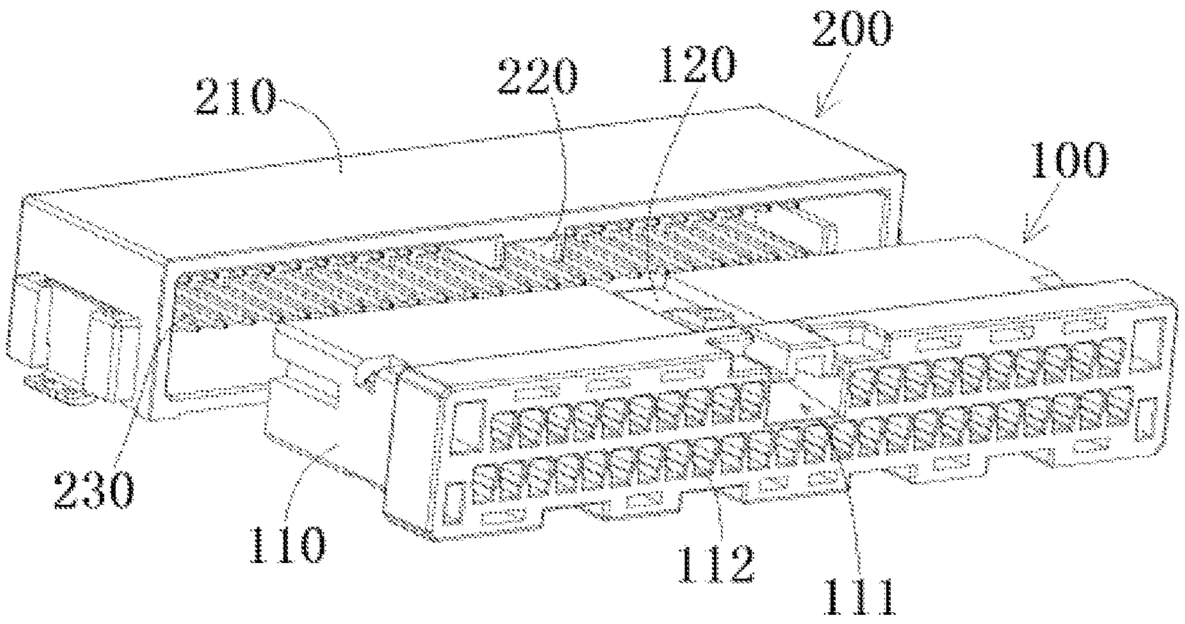
FIG. 1 is a perspective view of a connector and a mating connector when the connector and the mating connector have not been mated together.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth to provide a thorough understanding of the disclosed embodiments. It will be apparent, however, that one or more embodiments may be practiced without these specific details. In other instances, well-known structures and devices are schematically shown to simplify the drawing.

Figure 5:
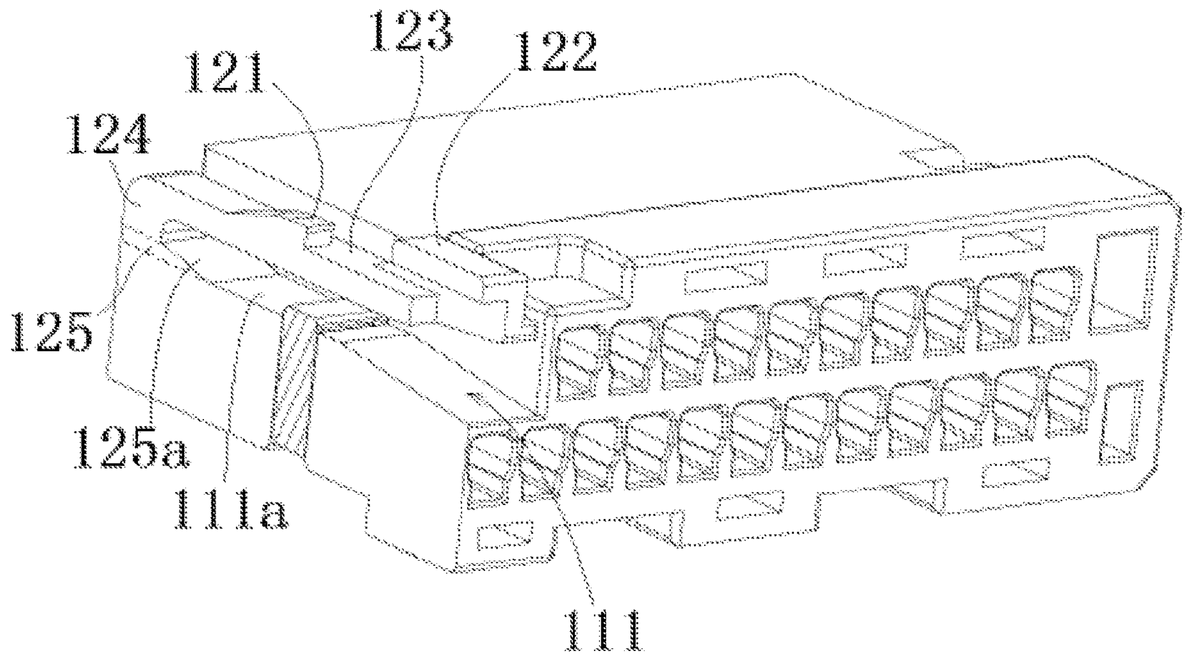
FIG. 5 is a sectional perspective view of the connector of FIG. 1.

FIG. 1 shows an illustrative perspective view of a connector 100 and a mating connector 200 according to an exemplary embodiment of the present invention, wherein the connector 100 and the mating connector 200 have not been mated together. FIG. 5 shows a longitudinal sectional view of the connector 100 shown in FIG. 1.

As shown in FIGS. 1 and 5, in the illustrated embodiment, the connector 100 includes a housing 110 and an elastic latch 120. The elastic latch 120 includes an elastic cantilever 123. The elastic cantilever 123 has a free end, a fixed end 124, 125 connected to the housing 110, and a main part extending between the free end and the fixed end.

As shown in FIG. 5, the fixed end 124 and 125 of the elastic cantilever 123 has an inclined surface 125*a* extending inclined with respect to the surface 111*a* of the housing 110. An angle between the inclined surface 125*a* and the surface 111*a* of the housing 110 is greater than 90 degrees. That is, the inclined surface 125*a* extends to the surface 111*a* of the housing 110 by an angle greater than 90 degrees with respect to the surface 111*a* of the housing 110. The inclined surface 125*a* improves the connection strength of the elastic cantilever 123 to the housing 110 and can meet the special application of large locking force.

In the embodiment shown in FIG. 5, the fixed end 124 and 125 of the elastic cantilever 123 includes a square cone part 125 and an arc transition part 124. The square cone part 125 is formed on the housing 110. The arc transition part 124 is connected between the top surface of the square cone part 125 and the end face of the main part of the elastic cantilever 123. The inclined surface 125*a* is one side surface of the square cone part 125 facing the main part of the elastic cantilever 123, and the inclined surface 125*a* extends obliquely downward from the arc transition part 124 in a direction away from the arc transition part 124.

As shown in FIG. 5, an inclination angle of the inclined surface 125*a* relative to a horizontal plane perpendicular to a height direction of the connector 100 is greater than 90 degrees and less than 180 degrees. In an exemplary embodiment of the present invention, the inclination angle of the inclined surface 125*a* relative to the horizontal plane can be in the range of 135-155 degrees.

In the embodiment shown in FIG. 5, the arc transition part 124 of the elastic cantilever 123 is in a quarter circular ring with a predetermined radius. The height of the square cone part 125 is equal to or less than the radius of the arc transition part 124 of the elastic cantilever 123. At least one of other three side surfaces of the square cone part 125 except for the inclined surface 125*a* extends in a vertical direction parallel to the height direction of the connector 100. At least one of other three side surfaces of the square cone part 125 except for the inclined surface 125*a* extends obliquely downward from the arc transition portion 124 in a direction away from the arc transition portion 124.

As shown in FIGS. 1 to 5, in the illustrated embodiment, the elastic latch 120 also includes a protrusion 121 formed on the elastic cantilever 123, which is suitable for engaging with a step part 221 formed on a mating housing 210 of the mating connector 200 to lock the connector 100 to the mating connector 200. The elastic latch 120 also includes an unlocking part 122 formed on the free end of the elastic cantilever 123. The elastic latch 120 is adapted to be unlocked from the step part 221 by pressing the unlocking part 122. In this way, the connector 100 can be pulled out of the mating connector 200.

Figure 3:
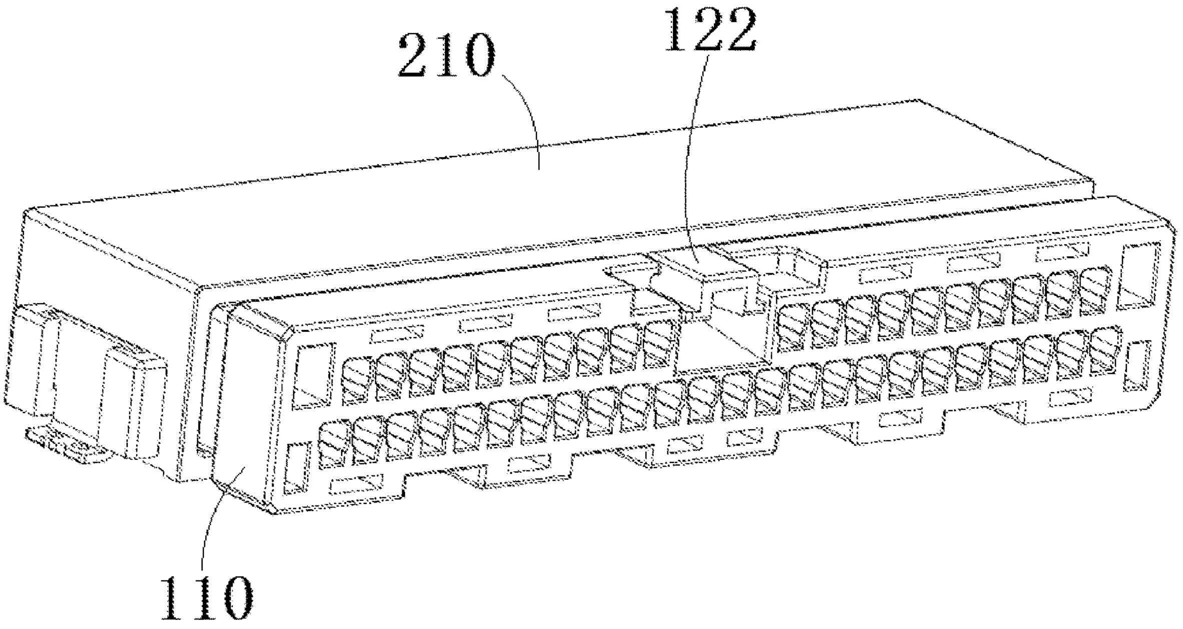
FIG. 3 is a perspective view of the connector and the mating connector mated together.
Figure 4:
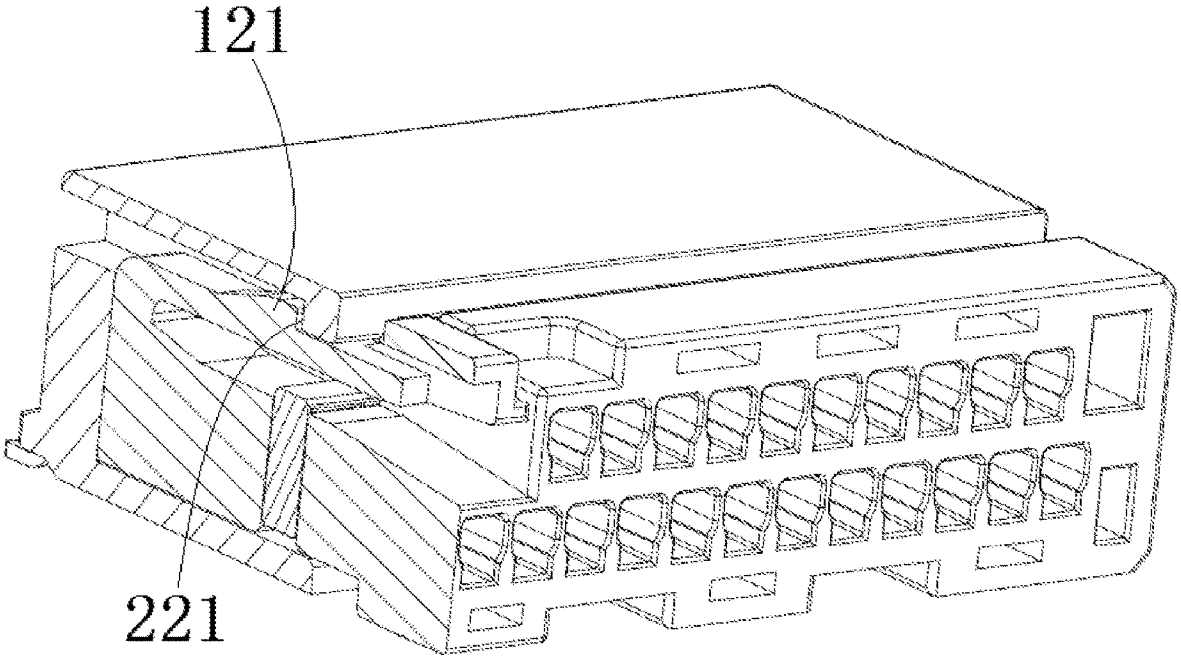
FIG. 4 is a sectional perspective view of the connector and the mating connector of FIG. 3.

As shown in FIGS. 3 and 4, the housing 110 of the connector 100 is inserted into the mating housing 210 of the mating connector 200. When the connector 100 and the mating connector 200 are mated together, the unlocking part 122 is located outside the housing 210 of the mating connector 200. In this way, the unlocking part 122 can be easily pressed by a finger, and the unlocking between the connector 100 and the mating connector 200 can be easily realized.

Figure 2:
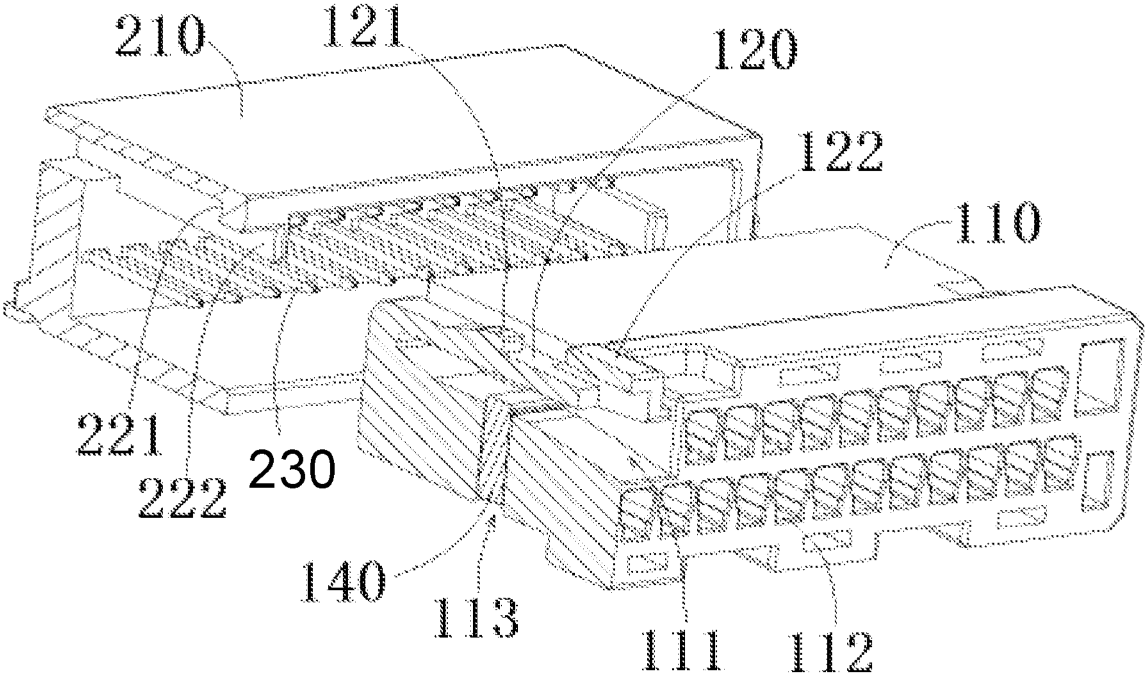
FIG. 2 is a sectional perspective view of the connector and the mating connector of FIG. 1.

As shown in FIGS. 1, 2, and 5, a slot 111 extending along the longitudinal direction of the connector 100 is formed on the housing 110 of the connector 100. The square cone part 125 is formed on the bottom surface 111*a* of the slot 111, and the elastic latch 120 is accommodated in the slot 111.

In an embodiment, the housing 110 and the elastic latch 120 are integrally formed into a single piece, for example, by injection molding.

As shown in FIG. 2, a gap is formed between the elastic cantilever 120 and the inner side surface of the slot 111. A guide rib 222 is formed on the inner wall of the mating housing 210. The guide rib 222 is adapted to be inserted into the gap between the elastic cantilever 120 and the inner side surface of the slot 111.

In the shown embodiment, a plurality of terminal slots 112 extending along the longitudinal direction of the connector 100 are formed on the housing 110 of the connector 100. The connector 100 also includes a plurality of terminals, which are respectively inserted into the plurality of terminal slots 112. The plurality of terminals is adapted to respectively mate with a plurality of mating terminals 230 of the mating connector 200.

As shown in FIG. 2, a bottom slot 113 penetrating through the plurality of terminal slots 112 along the transverse direction of the connector 100 is formed on the bottom surface of the housing 110 of the connector 100. The connector 100 also includes a locking member 140 inserted into the bottom slot 113 for locking the plurality of terminals of the connector 100 in the plurality of terminal slots 112.

In an exemplary embodiment of the present invention, there is also provided a connector assembly. The connector assembly comprises the above connector 100 and the mating connector 200 suitable for mating with the connector 100.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle. Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of said elements or steps, unless such exclusion is explicitly stated. Furthermore, references to “one embodiment” of the present invention are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

What is claimed is:

1. A connector, comprising:

a housing; and an elastic latch including an elastic cantilever having a free end, a fixed end connected to the housing, and a main part extending between the free end and the fixed end, the fixed end including:

an inclined surface extending inclined with respect to a surface of the housing, an angle between the inclined surface and the surface of the housing is greater than 90 degrees;

a square cone part formed on the housing; and an arc transition part connected between a top surface of the square cone part and the main part of the elastic cantilever, the arc transition part being a quarter circular ring with a predetermined radius, the inclined surface extending continuously and linearly between a first end of the arc transition part and the surface of the housing, wherein the main part of the elastic cantilever is connected to a second end of the quarter circular ring opposite the first end, and the first end of the arc transition part connects to the top surface of the square cone part.

2. The connector of claim 1, wherein the inclined surface is a side surface of the square cone part facing the main part of the elastic cantilever, the inclined surface extends obliquely downward from the arc transition part in a direction away from the arc transition part.

3. The connector of claim 2, wherein at least one of other three side surfaces of the square cone part except for the inclined surface extends in a vertical direction parallel to a height direction of the connector.

4. The connector of claim 2, wherein at least one of other three side surfaces of the square cone part except for the inclined surface extends obliquely downward from the arc transition part in the direction away from the arc transition part.

5. The connector of claim 1, wherein an inclination angle of the inclined surface relative to a horizontal plane perpendicular to a height direction of the connector is greater than 90 degrees and less than 180 degrees.

6. The connector of claim 5, wherein the inclination angle is within a range of 135-155 degrees.

7. The connector of claim 1, wherein a height of the square cone part is equal to or less than the predetermined radius of the arc transition part.

8. The connector of claim 1, wherein the elastic latch has a protrusion on the elastic cantilever, the protrusion engages a step part of a mating housing of a mating connector to lock the connector to the mating connector.

9. The connector of claim 8, wherein the elastic latch has an unlocking part formed on the free end of the elastic cantilever, the elastic latch is unlocked from the step part by pressing the unlocking part.

10. The connector of claim 9, wherein the housing is inserted into the mating housing and, when the connector and the mating connector are mated together, the unlocking part is located outside the mating housing.

11. The connector of claim 1, wherein the housing has a slot extending along a longitudinal direction of the connector.

12. The connector of claim 11, wherein the fixed end of the elastic cantilever is connected to a bottom surface of the slot, the elastic latch is accommodated in the slot.

13. The connector of claim 12, wherein a gap is formed between the elastic cantilever and an inner side surface of the slot, a guide rib formed on an inner wall of a mating housing of a mating connector is inserted into the gap.

14. The connector of claim 1, wherein the housing has a plurality of terminal slots extending in a longitudinal direction of the connector.

15. The connector of claim 14, further comprising a plurality of terminals inserted into the terminal slots, the terminals mate with a plurality of mating terminals of a mating connector.

16. The connector of claim 15, wherein the housing has a bottom slot on a bottom surface of the housing penetrating through the terminal slots along a transverse direction of the connector, the connector comprises a locking member inserted into the bottom slot to lock the terminals in the terminal slots.

17. The connector of claim 1, wherein the housing and the elastic latch are integrally formed in a single piece.

18. A connector assembly, comprising:

a connector including:

a housing having a slot extending along a longitudinal direction of the connector; and an elastic latch accommodated in the slot, the elastic latch including an elastic cantilever having a free end, a fixed end connected to the housing, a protrusion on the elastic cantilever, and a main part extending between the free end and the fixed end, the fixed end is connected to a bottom surface of the slot and includes:

an inclined surface extending inclined with respect to a surface of the housing, an angle between the inclined surface and the surface of the housing is greater than 90 degrees;

a square cone part formed on the housing; and an arc transition part connected between a top surface of the square cone part and the main part of the elastic cantilever, the arc transition part being a quarter circular ring with a predetermined radius, the inclined surface extending continuously and linearly between a first end of the arc transition part and the surface of the housing, wherein the main part of the elastic cantilever is connected to a second end of the quarter circular ring opposite the first end, and the first end of the arc transition part connects to the top surface of the square cone part; and a mating connector mateable with the connector and including a step part adapted to engage with the protrusion on the elastic cantilever to lock the connector to the mating connector, wherein:

a gap is formed on each side of the elastic cantilever and a corresponding inner side surface of the slot;

a pair of guide ribs are formed on an inner wall of a mating housing of the mating connector and are inserted into respective ones of the gaps; and the step part is defined and extends continuously between the pair of guide ribs.

* * * * *